United States Patent [19]

Ure

[11] Patent Number: 5,258,935

[45] Date of Patent: Nov. 2, 1993

[54] SELF-INPUTTING CHECKBOOK ACCOUNTING DEVICE

[76] Inventor: Michael J. Ure, 5619 Williamsburg Blvd., Arlington, Va. 22207

[21] Appl. No.: 800,713

[22] Filed: Dec. 3, 1991

Related U.S. Application Data

[63] Continuation of Ser. No. 505,667, Mar. 30, 1990, abandoned.

[51] Int. Cl.⁵ .............................................. G06F 15/02
[52] U.S. Cl. .......................... 364/705.02; 364/705.03; 364/709.11
[58] Field of Search ...................... 364/705.02, 705.03, 364/709.11; 382/7, 22

[56] References Cited

U.S. PATENT DOCUMENTS

| | | | |
|---|---|---|---|
| 3,487,371 | 12/1969 | Frank | 364/900 X |
| 4,070,649 | 1/1978 | Wright, Jr. et al. | 364/705.03 X |
| 4,620,062 | 10/1986 | Mizzi et al. | 178/18 |
| 5,063,600 | 11/1991 | Norwood | 364/705.03 X |

OTHER PUBLICATIONS

Morrissey, "Electronic Calculator based on character Recognition of input from stylus Acceleration Dynamics", IBM, T.D.B., vol. 19, No. 7, Dec. 1976, pp. 2816-2817.

Primary Examiner—Tan V. Mai

[57] ABSTRACT

A backing plastic for a carbon-style checkbook is provided with a stylus sensor to sense the position of a writing instrument as a check is written. The position of the writing instrument is input to a microcomputer that calculates beginning and ending vectors for each written character to decipher its identity. The amount of the check is then subtracted from the checkbook balance, which is updated and permanently stored. The amount of each of a checkbook of checks is also permanently stored and an attachment provided to allow a check register to be printed out on a standard computer printer. A beginning-and-ending-vector system of number recognition allows for recognition of a wide range of writing styles within certain basic limits. Nonrecognition is signified by an audible tone after which the numbers may be retraced with slightly more care, if necessary, to allow for recognition. Checks may be voided by scratching out the written amount. Deposits and periodic interest payments may be entered in like manner using deposit slips provided with the checkbook. The microcomputer is provided with a keyboard and display and may also serve as a checkbook calculator.

1 Claim, 11 Drawing Sheets

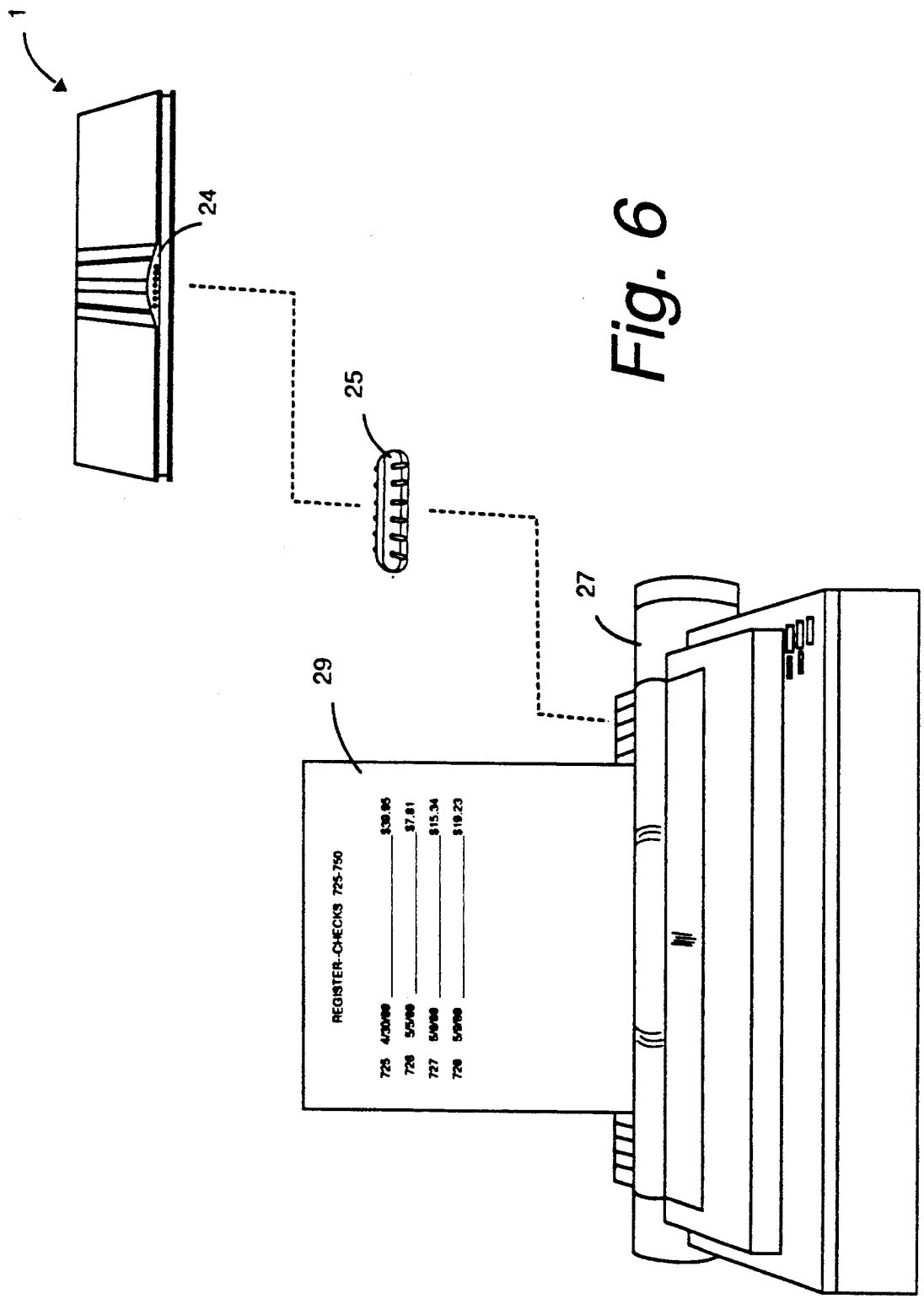

SELF-INPUTTING CHECKBOOK ACCOUNTING DEVICE

This application is a continuation of application Ser. No. 505,667, filed Mar. 30, 1990, now abandoned.

BACKGROUND OF THE INVENTION

The present invention relates to checkbook accounting devices and more particularly to an electronic check register and checkbook balance keeper that does not require any separate input operation.

Although there may exist persons to whom balancing a checkbook and keeping an up-to-date check register brings a sense of satisfaction and accomplishment, to the overwhelming majority of people, these tasks are either a nuisance, a heartfelt burden, or, in extreme instances, so exasperating a task that it is virtually never performed. While other areas of check processing have enjoyed the benefits of a high degree of automation, such automation has principally been applied by banks to the check collection process. Automation for the benefit of the customer of checking services has been slow to take hold. Efforts to provide such automation in the past have resulted in solutions that are hardly less tedious than the underlying task itself.

Complicating the problem is that most checks are hurridly written, for example in a long line at the grocery store, to minimize delay to waiting customers. Checkbook accounting systems that require a separate notation or input step at the time of the underlying transaction therefore suffer a disadvantage. Likewise, checkbook accounting systems wherein entries are made after the underlying transaction suffer the disadvantage that the more time passes, the less urgency recording the transaction seems to assume.

An object of the present invention, then, is to provide an improved checkbook accounting system.

Another object of the present invention is to provide an electronic check register and checkbook balance keeper.

A further object of the present invention is to provide an electronic check register and checkbook balance keeper that does not require any separate input operation.

Still a further object of the present invention is to provide an electronic check register and checkbook balance keeper that senses the amount of a check as it is written.

SUMMARY OF THE INVENTION

According to the present invention, a backing plastic for a carbon-style checkbook is provided with a stylus sensor to sense the position of a writing instrument as a check is written. The position of the writing instrument is input to a microcomputer that calculates beginning and ending vectors for each written character to decipher its identity. The amount of the check is then subtracted from the checkbook balance, which is updated and stored non-volatilely.

The amount of each of a checkbook of checks is also stored non-volatilely and an attachment provided to allow a check register to be printed out on a standard computer printer.

The beginning and ending vector system of number recognition allows for recognition of a wide range of writing styles within certain basic limits. Nonrecognition is signified by an audible tone after which the numbers may be retraced with slightly more care, if necessary, to allow for recognition. Checks may be voided by scratching out the written amount. Deposits and periodic interest payments may be entered in like manner using deposit slips provided with the checkbook or by manual input. The microcomputer is provided with a keyboard and display and may also serve as a checkbook calculator.

BRIEF DESCRIPTION OF THE DRAWING

FIG. 5, including

FIG. 6 is a perspective view showing a manner of printing out a check register using a standard computer printer.

DETAILED DESCRIPTION OF THE PREFERED EMBODIMENT

Figure 1:
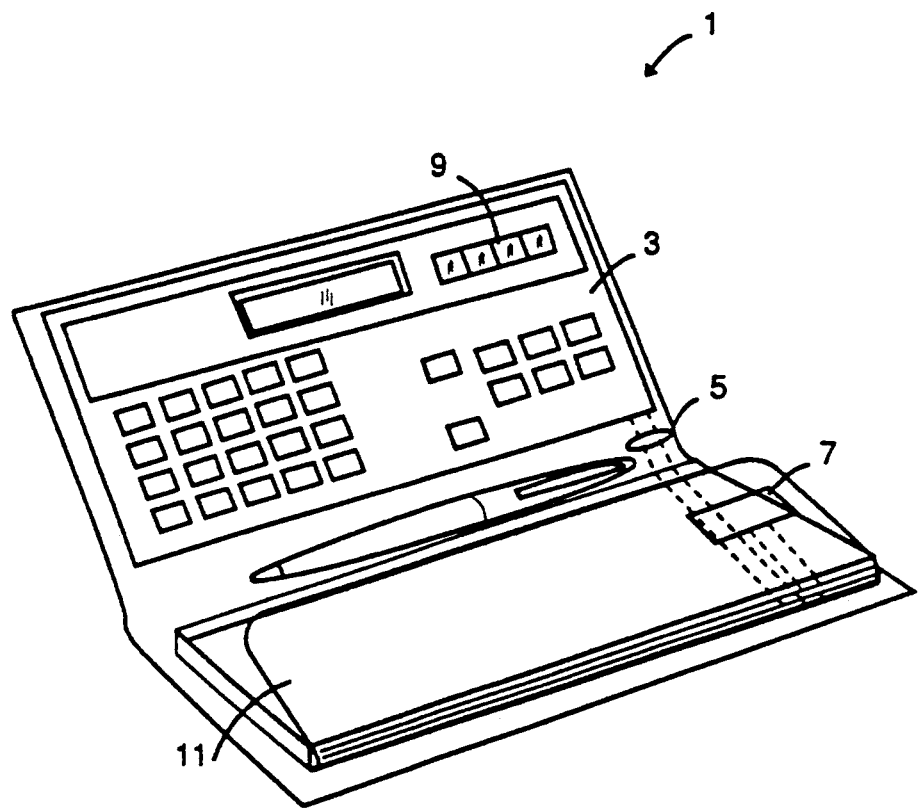
FIG. 1 is a perspective view of the electronic check register and checkbook balance keeper of the present invention.

Referring now to FIG. 1, the checkbook accounting device 1 of the present invention resembles an ordinary checkbook of the carbon type with the addition of a checkbook calculator/balance keeper 3 coupled by a wire pair 5 to a pad 7. The calculator/balance keeper is preferably of low-power CMOS construction and preferably includes a number of "permanent" storage locations greater than the number of checks in a series. Solar panels 9 are responsive to incident light upon opening of the checkbook to cause the present checkbook balance to be displayed and to power the display operation.

Figure 2:
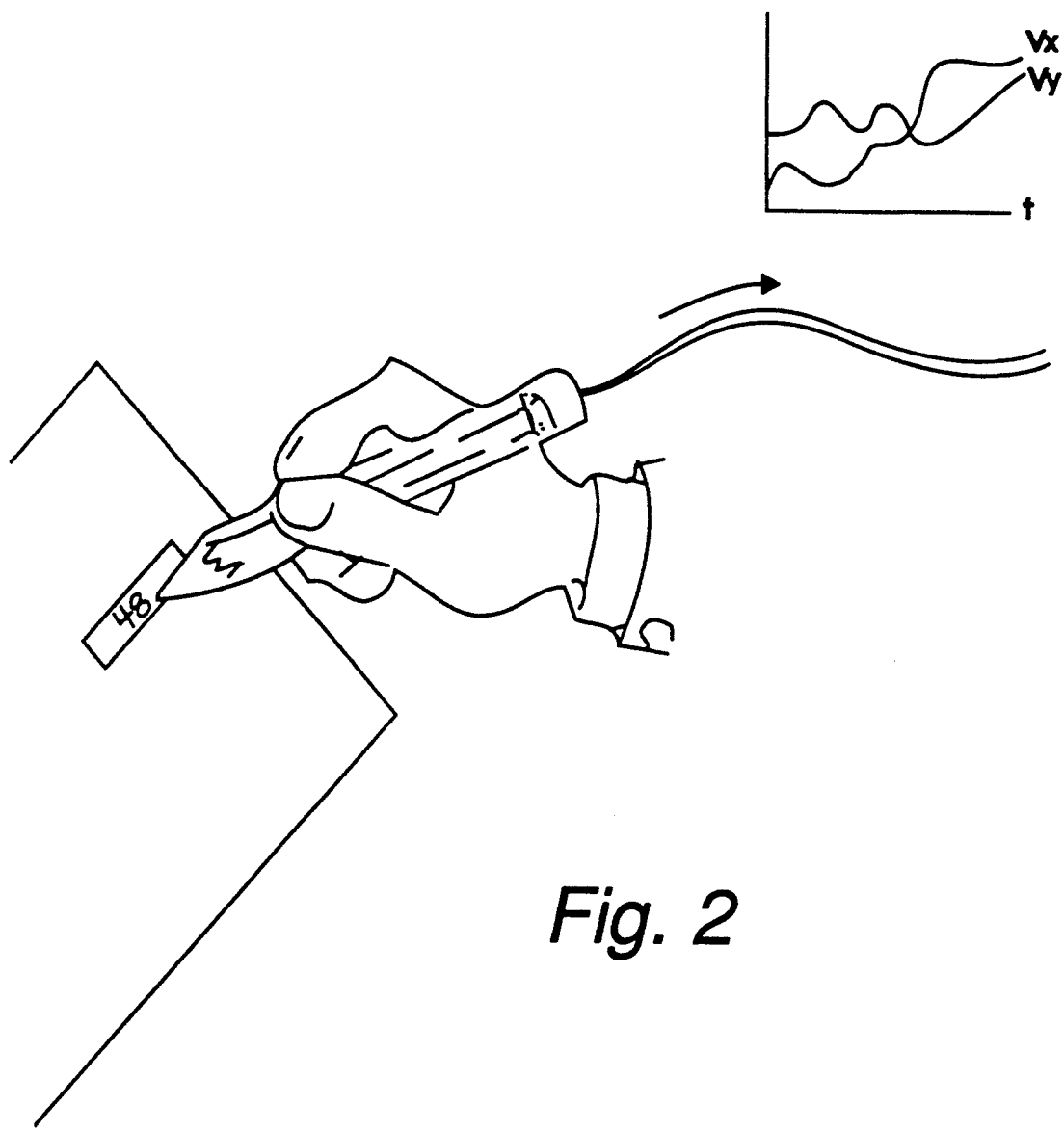
FIG. 2 is a schematic illustration of the principle of operation of the present invention.

According to the principle of the present invention, the backing plastic 11 normally provided in a carbon-type checkbook to underlie the check being written so as to prevent the writing from penetrating through to the carbons of others checks is further provided with a pressure-sensitive pad 7 underlying the amount box printed on the check so as to produce X and Y potentials corresponding to the position of the pen. The calculator/balance keeper is programmed to, upon receiving time varying X and Y signals across the wire pair as illustrated schematically in FIG. 2, exit a standard calculator mode and enter a numeric decode mode wherein numerals written in the check amount box are decoded to detect the amount of the check without the necessity of separately entering the amount into the balance keeper. X and Y signals representing the position of the pen may be produced in like manner as in U.S. Pat. No. 3,487,371 or U.S. Pat. No. 4,620,062, both incorporated herein by reference, although interpretation of those signals is accomplished differently. The starting-and-ending-vector detection method to be described allows for variation in individual handwriting and is independent of the size of the numerals, allowing the last two numerals to be interpretted as the cents amount of the check.

Figure 3:
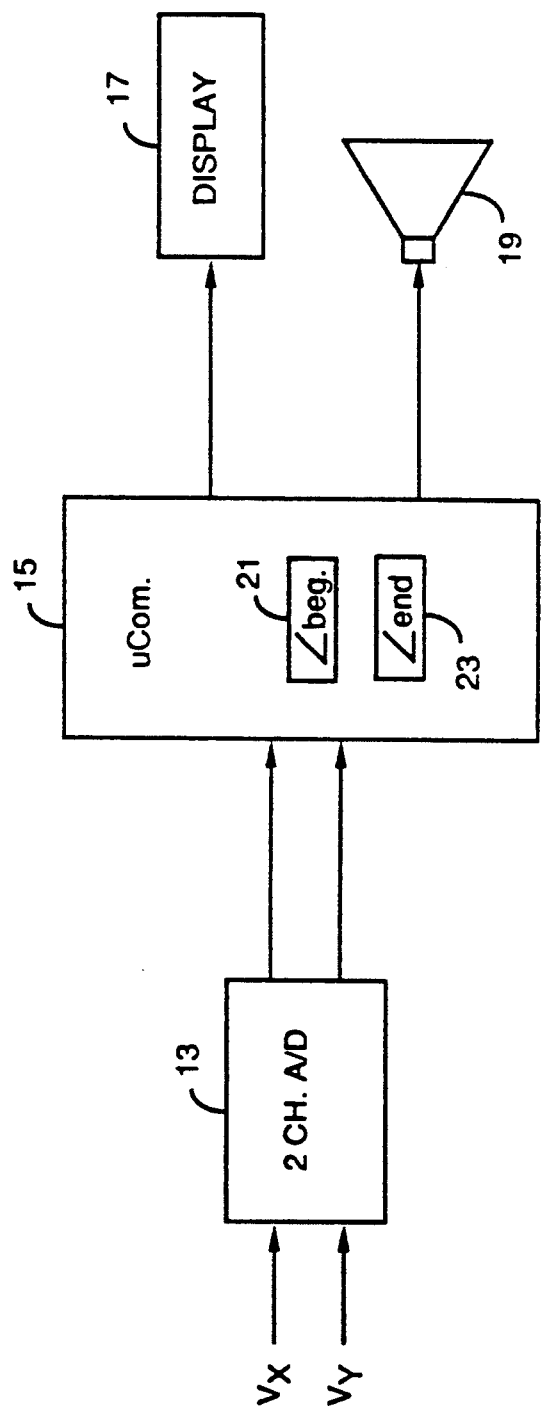
FIG. 3 is a simplified block diagram showing the principal parts of the present invention.

Referring to FIG. 3, the hardware of the balance keeper consists essentially of a two-channel A/D converter 13 for presenting digital representations of the XY signals to a suitably programmed microcomputer 15, provided with an LCD display 17 and a beeper 19. Included among the internal registers of the microcomputer are a beginning angle register and an ending angle register according to the contents of which the numeral just written may be distinguished.

Figure 4:
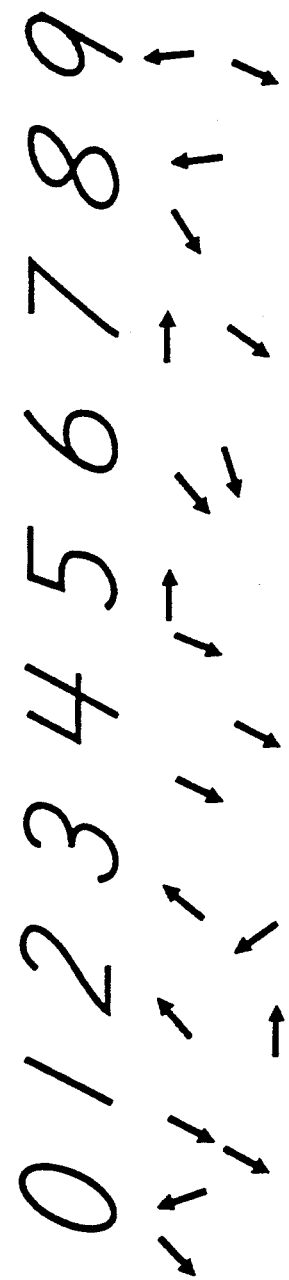
FIG. 4 is a diagram used to explain the beginning and ending vector system of number recognition of the present invention.

Referring to FIG. 4, the present invention assumes that numerals are written in standard script form without needless embellishment or flourishes. The numerals 2, 3 and 7, which begin with a stroke to the right, for instance, are not allowed to begin with a small loop starting toward the left as may be the habit of some writers. Similarly, the numerals 3 and 5, which end with a stroke to the left, are not allowed to end with a loop to the right as is sometimes the case. The numerals need not be any particular size, however, and the unadorned style of the numerals is easily learned and practiced.

Shown below each numeral are its starting and ending vectors. The numeral 0 is characterized by a starting vector to the lower left and an ending vector to the upper left whereas 1 is characterized by starting and ending vectors nearly straight downward.

The numerals 2 and 3 are characterized by the same starting vector, upward to the right, but opposite ending vectors, to the right and to the left, respectively. A 4 may be detected as starting and ending downstrokes with the ending downstroke occuring after a lift, or brief pause, but before a new character (longer pause). The 5 and the 7 have opposite starting and ending vectors, the 5 starting downward and ending rightward and the 7 just the opposite. The remaining numerals 6, 8 and 9 are characterized by starting and ending vectors as shown in FIG. 6.

Any of the common methods may be used for designating the cents amount of the check. Most straightforward, the cents amount is written in almost superscript fashion to the upper right of the dollar amount, and the last two digits are interpreted as the cents amount. Also, the cents amount may be underlined by a fraction bar and "XX" may additionally be written below the bar. Since none of these latter markings are interpreted as numbers, the last two numbers are still correctly interpreted as the cents amount. If writing out a complete fraction with the denominator "100" is preferred, the balance keeper may be programmed to interpret a fraction bar (beginning and ending vectors to the right) as the end of the amount entry such that the subsequent "100" is ignored.

Referring to FIG. 6, an adapter 25 may be provided to interface an output port 24 of the balance keeper to a typical computer printer 27 in order to print out an abbreviated check register 29 indicating the date, the time (optional) and the amount of each check, leaving a blank for the name of the payee to be filled in by hand from the check carbons to complete the check register. Alternatively, the incomplete register may be re-fed through the printer and any common word processing program used to fill in the names of the payees.

Enough memory registers may be fabricated on the wafer of a state-of-the-art credit-card calculator to easily handle the number of checks in a single series. The credit card calculator may also be required to withstand a certain degree of flexion, inevitable if the checkbook is to be placed in a person's back pocket, for example. In order to achieve sufficient functionality and storage capacity while maintaining the same flexion tolerance, two credit-card-type modules may be flexibly interconnected if necessary, one primarily a calculator and numeral recognizer and one primarily a data storage module.

Figure 5A:
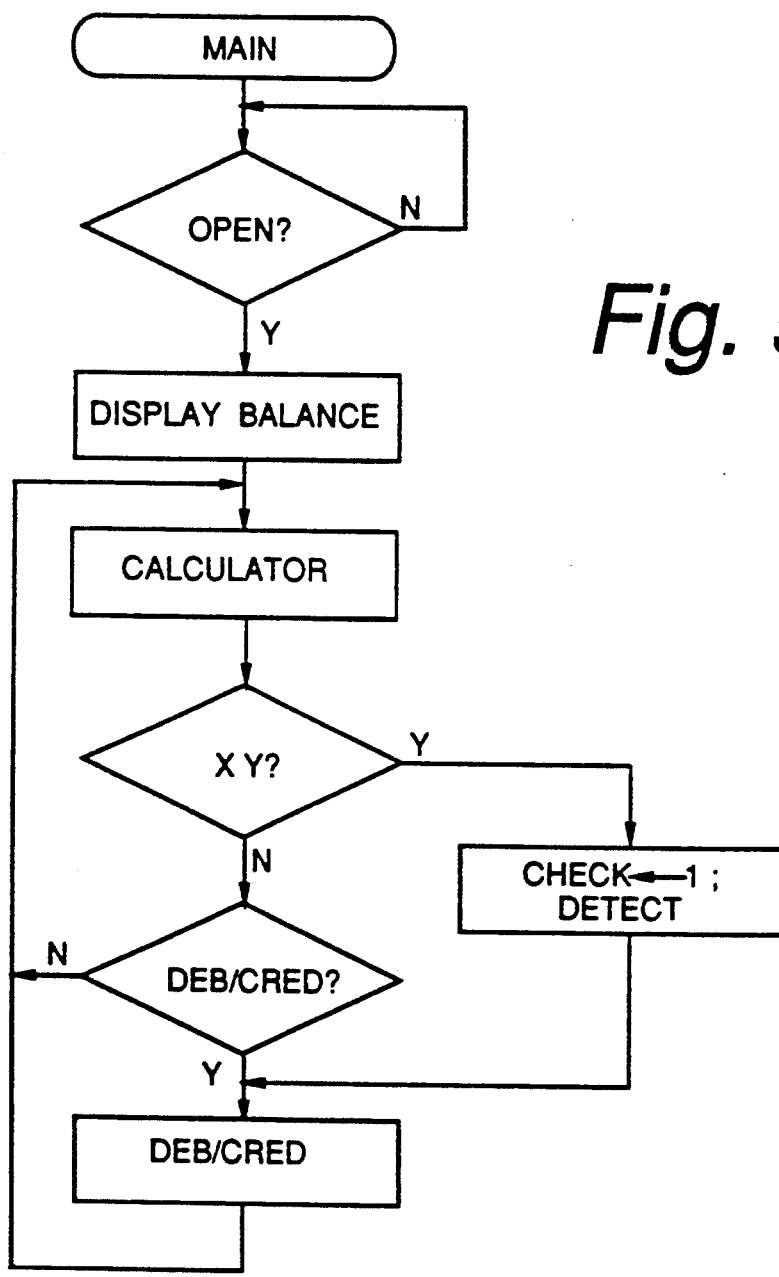
FIGS. 5a-5f, is a flowchart of the operation of the present invention.

Referring now to FIGS. 5a–5f, the operating program of the self-inputting checkbook accounting device of the present invention will be described in detail. Referring first to FIG. 5a, operation begins by detecting in that the checkbook has been opened. Such detection may be carried out using a light-sensitive photocell mounted on the face of the device, depicted as element 9 in FIG. 1. Upon detecting that the checkbook has been opened, the device displays the previous checkbook balance for reference by the operator. The device then becomes immediately useable as an ordinary calculator.

At frequent intervals during the calculator mode, the X and Y channels are monitored to detect the possible writing of a check. If the X and Y channels are active, a detect routine is then entered wherein the amount of the check is automatically detected and input, whereupon a debit/credit routine is executed as will be subsequently described.

Figure 5B:
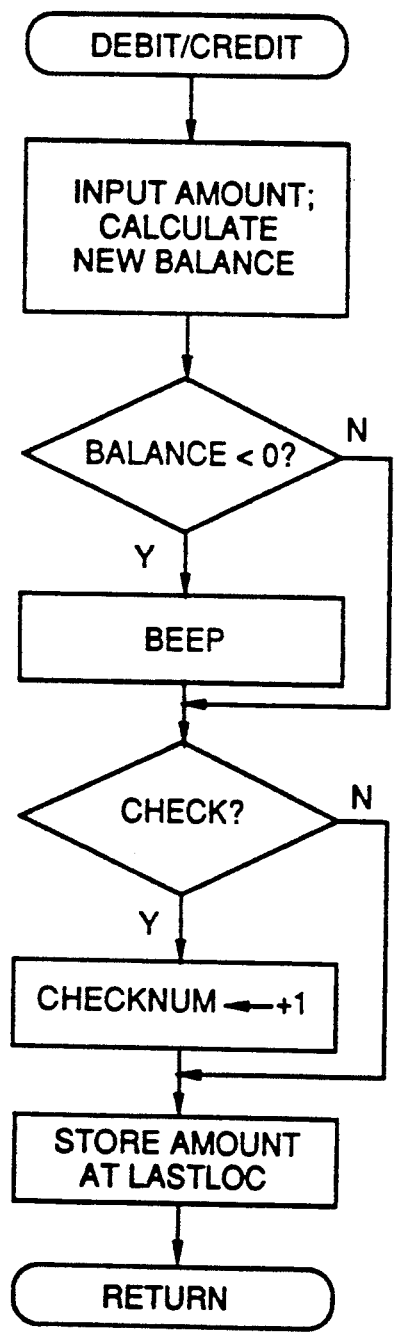
Figure 5C:
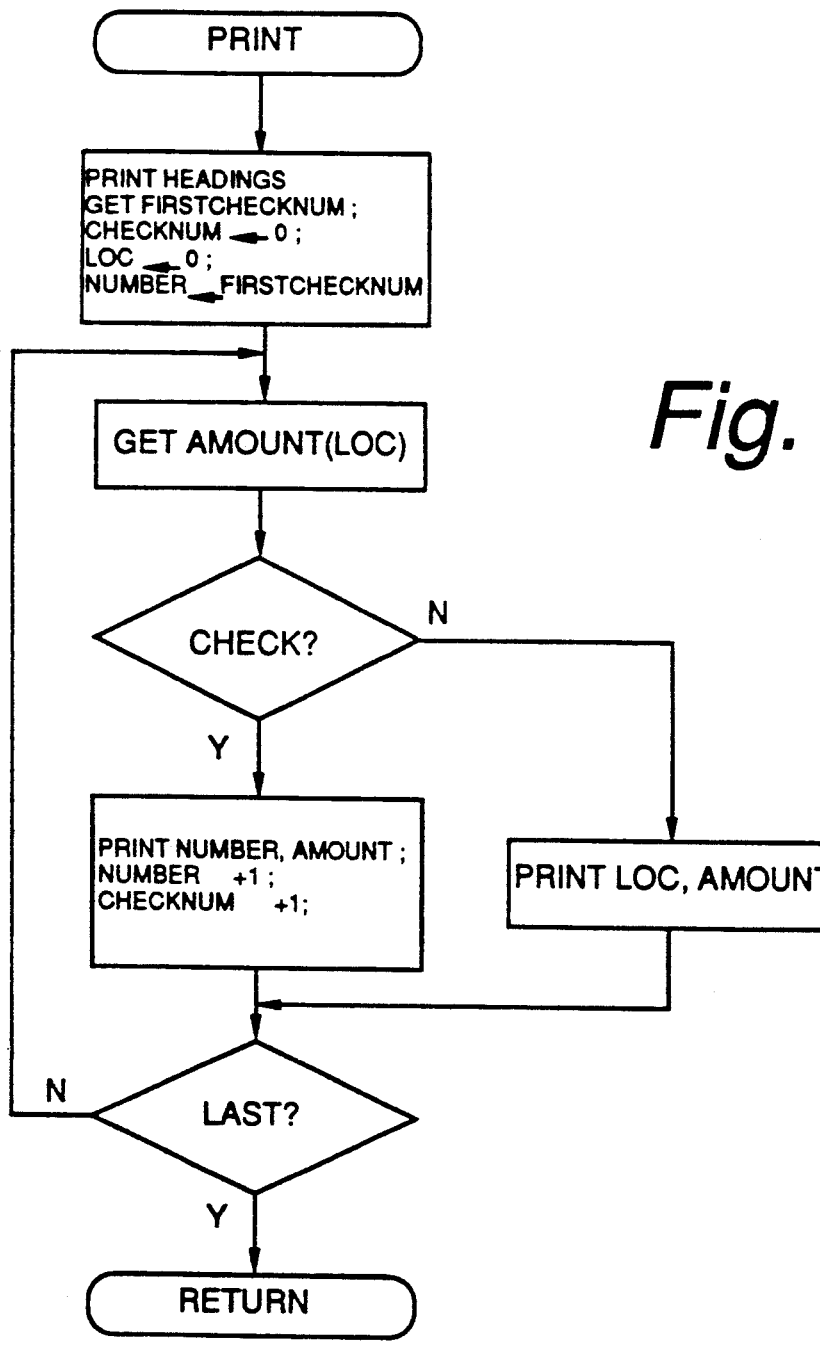

Also while in the calculator mode, the device checks to see whether a debit key DEB or a credit key CRED has been depressed, indicating manual input of a debit or credit entry. If one of the foregoing keys has been depressed, the debit/credit routine is also entered as shown in FIG. 5b.

In the debit/credit routine, an amount written or keyed into the device is input and a new balance calculated according to whether a check or deposit slip is being written or the DEB or CRED key was depressed. If the new balance is negative, an audible tone is produced to alert the operator. The debit/credit routine is entered in the case of both manual input using the DEB and CRED keys and automatic input. In the case of automatic input, an electronic check register is kept by incrementing a check-number counter and storing the detected amount at a corresponding memory location. The debit/credit routine is then exited. At the conclusion of the debit/credit routine, ordinary calculator mode is reentered as shown in FIG. 5a.

The electronic check register of the present device preferably is of a capacity sufficient to record all the checks of a single series. When those checks are exhausted, the electronic check register may be printed out according to the routine shown in FIG. 5c. First, appropriate headings are printed, after which the first check number of the series is retrieved to be used as an offset such that the actual check numbers appearing on the checks may be printed instead of just their ordinal numbers. A variable CHECK-NO for counting the ordinal number is then initialized to zero and a variable NUMBER for keeping track of the check number to be printed is initialized to the first check number of the series. Thereafter, the check number and the corresponding amount are printed and the variable NUMBER and CHECK-NO are incremented, these two steps being performed interatively until the number and amount of the last check have been printed.

Figure 5D:
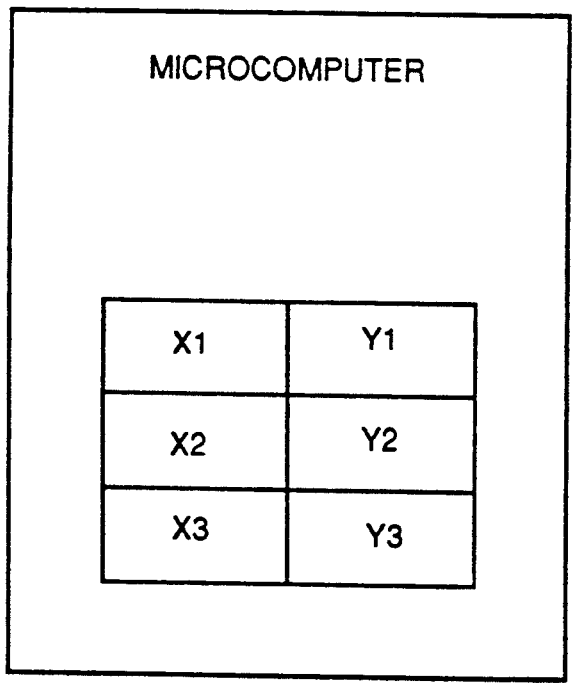

The detect routine will now be described with reference to FIGS. 5d–5f. As shown in FIG. 5d, three pairs of registers X1 Y1, X2 Y2, and X3 Y3 are designated for the purpose of identifying a written numeral by means of its starting and ending vectors in a manner illustrated in FIG. 5e. The microprocessor is programmed to treat the three pairs of registers as a circular queue such that once the three pairs of registers have been written to, successive data are then written in such a manner to replace the data in the pair of registers containing the oldest data.

Figure 5E:
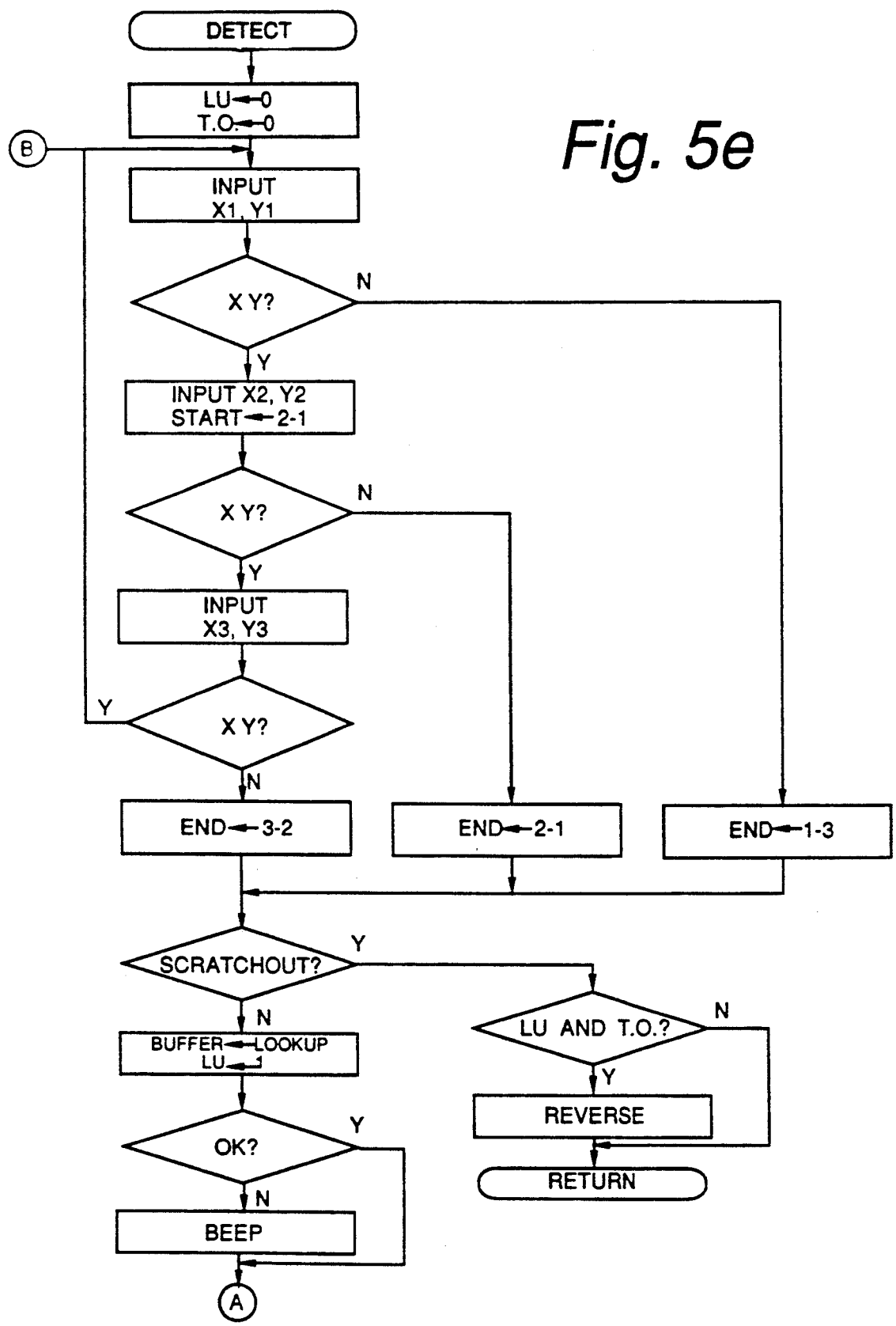

Referring now to FIG. 5e, as soon as variation of the X and Y signals is detected, a data pair X1 Y1 is stored in register pair X1 Y1, representing the starting point of a pen stroke in the amount field of the check. After an appropriate sampling interval, X2 and Y2 are written to the register pair X2 Y2 and a starting vector is calcualted as arctan(Y2−Y1/X2−X1). After a further sampling interval, X3 Y3 are stored in the register pair X3 Y3. Thereafter, so long as the X and Y channels continue to be active, a new data pair replace the oldest data pair each sampling interval. When the X and Y channels have gone inactive, indicating that the pen has been lifted from the surface of the paper, the last and next-to-last written data pairs are used to calculate an ending vector.

In addition to the digital sampling type operation just described, the device of the present invention also incorporates analog processing circuitry for the purpose of detecting when a check is voided by scratching out the written amount. In order to detect this occurrence, the sum of the absolute values of the respective rates of change of the X and Y channels is integrated and compared with a threshold indicative of "scratchout". If a scratchout is detect, the last debit/credit operation is undone, assuming lookup and timeout have both occurred as indicated by the flags LU and T.O. and further explained hereinafter.

Assuming no scratchout is indicated, the starting and ending vectors previously calculated are applied to a lookup memory to determine the identity of the written numeral. For this purpose, the computational results may be rounded off to an appropriate number of significant digits such that the otherwise continuous results of the arctangent function become discrete. Furthermore, the lookup table is arranged so that the same numeral value is entered in multiple locations in the lookup memory such that an acceptable range of vectors about a nominal starting and ending vector is identified as the same written numeral. For those combinations of starting and ending vectors that do not indicate a valid written numeral, a special identifier is stored in the lookup memory. When this identifier is read out of the lookup memory, an audible tone is produced to alert the operator that the numeral was unidentifiable. That numeral may then be retraced with a greater degree of care so that it may be recognized by the device.

That portion of the routine described thus far is repeated, identifying successive numerals, until a time-out condition wherein the X and Y channels have been inactive for a predetermined durartion occurs. This condition signifies that the last numeral of the check amount has been written.

The present invention is designed to allow the cents portion of the amount to be designed in a number of different common ways. In a first method, the cents amount is designated using smaller numerals raised one-half line. Since the size of the numerals does not affect identification by the starting and ending vectors method, the last two numerals are simply taken to be the cents amount. In another method, a fraction is formed by writing "100" under a horizontal bar or to the right of a slash. The present invention may be programmed to identify the bar or slash and take the preceding two numerals as the cents amount.

According to a further feature of the present invention, checks may be debited against the account balance as well as deposits credited to the account. To distinguish credits from debits, a plus mark or other identifying mark may be made preceding or following the amount of the credit on a deposit slip, for example. The device may be programmed to recognize the distinguishing mark and to set a flag or sign bit in response thereto. Once the amount of the debit or credit has been detected, the amount is recorded and the balance adjusted in the DEBIT/CREDIT subroutine.

Figure 5F:
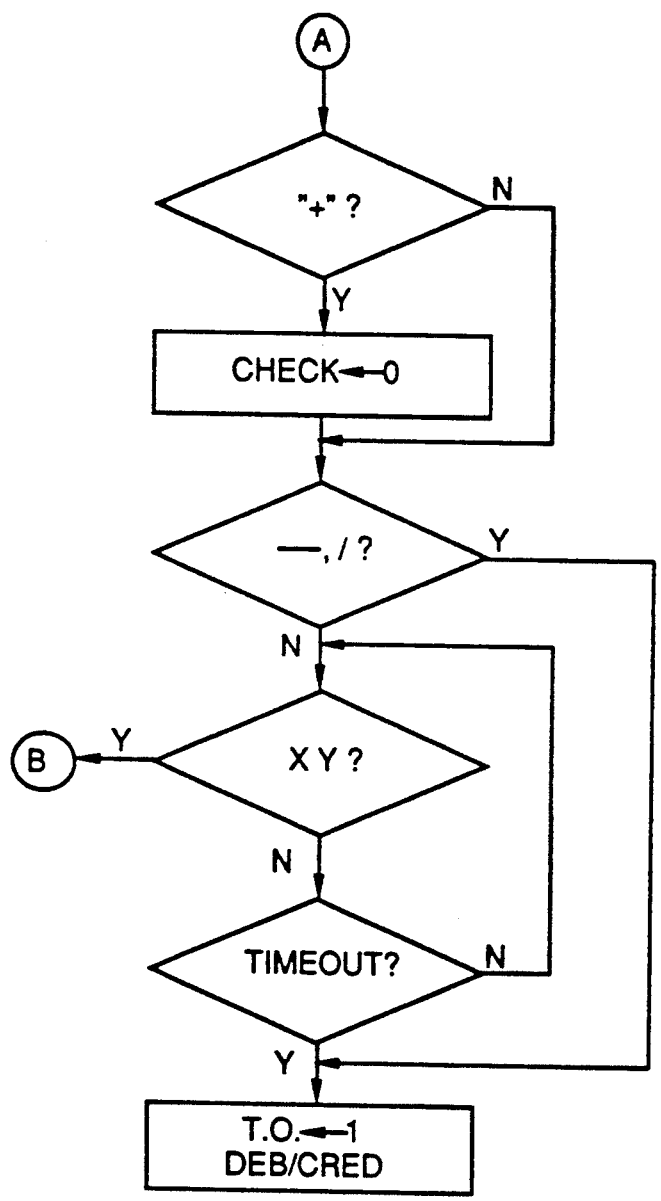

As shown in FIG. 5f, therefore, besides the numerals 0–9, the checkbook accounting device is also programmed to recognize "+" sign, in which case a CHECK flag is set to zero so as to indicate a credit, and a horizontal or diagonal fraction bar, in which case the relevant numerals representing the amount have already been detected so that a timeout is forced. Otherwise, a timeout occurs upon a prescribed period of inactivity of the XY channels, whereupon the T.O. flag is set and the debit/credit routine is entered.

In order to prevent jitters of a somewhat unsteady hand from being interpreted as part of the written numeral, it may be necessary to perform low-pass filtering on the X and Y channels. Although such filtering is not sufficient to render an extremely unsteady hand intelligible to the device, it may nevertheless render intelligible a hand unsteady in some degree.

Referring again to FIG. 6, the balance keeper may be interfaced to the computer printer either through the edge of the checkbook, as illustrated, or the balance keeper may be removed from the checkbook and separately interfaced to the printer. In either case, the interface may be an active device if necessary to provide sufficient current drive to the printer. The beginning check number in the current series may also be programmed into the balance keeper to provide an offset number so that the printed number on the check register corresponds to the actual check number.

Thus the self-inputting checkbook accounting device of the present invention, insofar as possible, eliminates the burden of balancing a checkbook. Further possible features and improvements will be apparent to those of ordinary skill in the art. For example, a feature may be added whereby a current balance may be reconciled with a bank statement by inputting the check numbers of checks written but not yet cleared. The foregoing embodiments are therefore to be regarded in all respects as illustrative only, the scope of the invention being clearly set forth in the following claims.

I claim:

1. A checkbook accounting device for use with a book of checks and an ordinary pen, comprising:
    flexible backing sheet means to be interleaved between individual ones of said checks, said flexible backing sheet means including electro-sensitive means and having a position wherein said electro-sensitive means underlies a check and is responsive to said ordinary pen for sensing an amount of said check at the time said check is written;
    a microcomputer connected to said electro-sensitive means for receiving signals representing said amount and updating a checkbook balance; and
    output means connected to said microcomputer for outputting said checkbook balance.

* * * * *